(12) United States Patent
Wang et al.

(10) Patent No.: US 12,312,262 B2
(45) Date of Patent: May 27, 2025

(54) ASSEMBLY OF RANDOM COPOLYMER POLYELECTROLYTE COMPLEXES FOR REMOVAL OF CONTAMINANTS FROM WATER

(71) Applicant: Northwestern University, Evanston, IL (US)

(72) Inventors: Jeremy Wang, Evanston, IL (US); Monica Olvera de la Cruz, Wilmette, IL (US); John M. Torkelson, Skokie, IL (US)

(73) Assignee: Northwestern University, Evanston, IL (US)

( * ) Notice: Subject to any disclaimer, the term of this patent is extended or adjusted under 35 U.S.C. 154(b) by 438 days.

(21) Appl. No.: 17/798,379

(22) PCT Filed: Mar. 1, 2021

(86) PCT No.: PCT/US2021/020191
§ 371 (c)(1),
(2) Date: Aug. 9, 2022

(87) PCT Pub. No.: WO2021/178269
PCT Pub. Date: Sep. 10, 2021

(65) Prior Publication Data
US 2023/0082329 A1    Mar. 16, 2023

Related U.S. Application Data

(60) Provisional application No. 62/983,843, filed on Mar. 2, 2020.

(51) Int. Cl.
*C02F 1/56*    (2023.01)
*B01D 21/01*    (2006.01)
(Continued)

(52) U.S. Cl.
CPC ............... *C02F 1/56* (2013.01); *B01D 21/01* (2013.01); *B03D 3/06* (2013.01); *C02F 1/285* (2013.01);
(Continued)

(58) Field of Classification Search
None
See application file for complete search history.

(56) References Cited

U.S. PATENT DOCUMENTS 3,947,354 A    3/1976 Swanson et al.
5,938,937 A    8/1999 Sparapany et al.
(Continued)

FOREIGN PATENT DOCUMENTS

WO    WO 2008/091740    7/2008

OTHER PUBLICATIONS

Wang, et al. Langmuir, 2023, 39, 7514-7523. (Year: 2023).*
(Continued)

*Primary Examiner* — Clare M Perrin
(74) *Attorney, Agent, or Firm* — Bell & Manning, LLC

(57) ABSTRACT

Methods for removing contaminants from aqueous media using polyelectrolyte complexes having a heterogeneous charge distribution are provided. The polyelectrolyte complexes are formed from an amphiphilic anionic random copolymer and a cationic random copolymer are provided. The polyelectrolyte complexes absorb cationic, anionic, or hydrophobic organic molecules and can be easily removed from water.

17 Claims, 15 Drawing Sheets

(51) Int. Cl.
*B03D 3/06* (2006.01)
*C02F 1/28* (2023.01)
*C02F 101/30* (2006.01)
*C02F 101/36* (2006.01)

(52) U.S. Cl.
CPC .... *C02F 2101/30* (2013.01); *C02F 2101/308* (2013.01); *C02F 2101/36* (2013.01); *Y02W 30/62* (2015.05)

(56) References Cited

U.S. PATENT DOCUMENTS

| | | | |
|---|---|---|---|
| 7,048,859 | B1 | 5/2006 | Moffett |
| 7,947,813 | B2 | 5/2011 | Fahrner et al. |
| 8,506,822 | B2 | 8/2013 | Moody et al. |
| 2006/0196834 | A1 | 9/2006 | Nichols et al. |
| 2014/0319069 | A1 | 10/2014 | Nichols et al. |
| 2015/0034563 | A1 | 2/2015 | Duggirala et al. |
| 2020/0318154 | A1 | 10/2020 | Xu et al. |
| 2023/0082329 | A1* | 3/2023 | Wang ................ C02F 1/56 210/734 |

OTHER PUBLICATIONS

Wang, et al. APS March Meeting Abstracts, 2021, F02.010. (Year: 2021).*

The International Search report and the Written Opinion issued on Apr. 28, 2021 for international patent application No. PCT/US2021/020191; pp. 1-7.

Panganiban, Brian, et al. "Random heteropolymers preserve protein function in foreign environments." *Science* 359.6381 (2018): 1239-1243.

Terashima, Takaya, et al. "Synthesis and single-chain folding of amphiphilic random copolymers in water." *Macromolecules* 47.2 (2014): 589-600.

Mengmeng Zhao et al., "Polyelectrolyte-Micelle Coacervates: Intrapolymer-Dominant vs Interpolymer-Dominant Association, Solute Uptake and Rheological Properties," *Royal Society of Chemistry* 2013, 00, 1-13.

Yu, Li, et al. "Confined flocculation of ionic pollutants by poly (L-dopa)-based polyelectrolyte complexes in hydrogel beads for three-dimensional, quantitative, efficient water decontamination." *Langmuir* 31.23 (2015): 6351-6366.

Melo, R. P. F., et al. "Removal of Reactive Blue 14 dye using micellar solubilization followed by ionic flocculation of surfactants." *Separation and Purification Technology* 191 (2018): 161-166.

Gudrun Petzold et al., "Polyelectrolyte Complexes in Flocculation Applications," *Adv Polym Sci* (2014) 256: 25-66. DOI: 10.1007/12_2012_205.

Meka, Venkata S., et al. "A comprehensive review on polyelectrolyte complexes." *Drug discovery today* 22.11 (2017): 1697-1706.

Delair, Thierry. "Colloidal polyelectrolyte complexes of chitosan and dextran sulfate towards versatile nanocarriers of bioactive molecules." *European Journal of Pharmaceutics and Biopharmaceutics* 78.1 (2011): 10-18.

Balea, Ana, et al. "Cellulose nanofibers and chitosan to remove flexographic inks from wastewaters." *Environmental Science: Water Research & Technology* 5.9 (2019): 1558-1567.

Ghosh, Mriganka M., Chris D. Cox, and Temkar M. Prakash. "Polyelectrolyte selection for water treatment." *Journal—American Water Works Association* 77.3 (1985): 67-73.

Roshchyna, Kateryna V., et al. "Micellar rate effects in the alkaline fading of crystal violet in the presence of various surfactants." *Journal of Molecular Liquids* 201 (2015): 77-82.

Thünemann, Andreas F., et al. "Polyelectrolyte complexes." Polyelectrolytes with defined molecular architecture II (2004): 113-171.

* cited by examiner

Anionic Random Copolymer

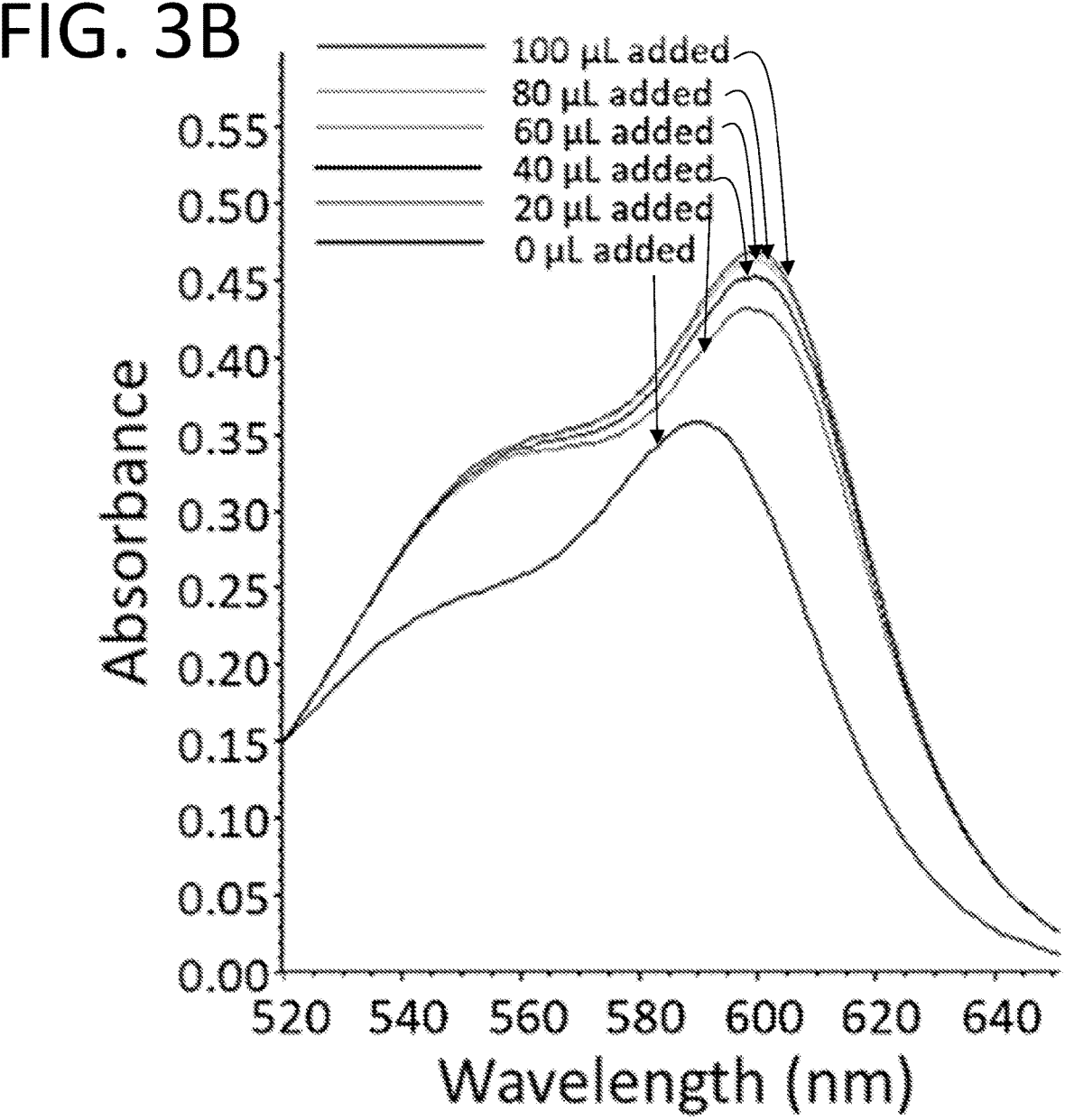

FIG. 5C

| Dye | Methyl Orange | Methyl Positive | Crystal Violet |
|---|---|---|---|
| Charge (e) | -1 | +1 | +1 |
| Electrostatic Energy in Solution (KT) | -0.91 ± 0.02 | -0.59 ± 0.01 | -0.44 ± 0.02 |
| Electrostatic Energy in in Complex (KT) | -1.45 ± 0.02 | -0.63 ± 0.02 | -0.42 ± 0.01 |
| Δ Electrostatic Energy (KT) (In Complex – In Solution) | -0.54 ± 0.04 | -0.04 ± 0.03 | +0.02 ± 0.03 |

ASSEMBLY OF RANDOM COPOLYMER POLYELECTROLYTE COMPLEXES FOR REMOVAL OF CONTAMINANTS FROM WATER

CROSS-REFERENCE TO RELATED APPLICATIONS

The present application is a National Stage of International Application No. PCT/US21/20191, filed Mar. 1, 2021, which claims priority to U.S. provisional patent application No. 62/983,843 that was filed Mar. 2, 2020, the entire contents of both of which are incorporated herein by reference.

BACKGROUND

Polyelectrolyte complexes are formed when oppositely charged polymers are mixed in aqueous solution. Due to the ionic interactions between the polymers, a wide range of behaviors can be observed, such as the formation of colloidal suspensions, liquid coacervates, or solid precipitates. The formation of solid precipitates with polyelectrolyte complexes can be particularly useful in separating particles from aqueous solutions, which is important in the paper-making industry and for water decontamination. The process of aggregating particles suspended in solution is known as flocculation and is widely employed in water treatment plants to remove negatively charged colloidal contaminants through the addition of a cationic salt or polymer to solution. Research into dual component flocculation has been conducted as well, where adding both a cationic and anionic polymer can create flocs that are more stable and more easily removed than their single component counterparts.

Traditionally, flocculation has been used to remove charged particulate contaminants such as fine clay particles from water. However, investigations have shown that flocculation can be an effective technique to remove organic contaminants such as dyes when combined with surfactants. (Petzold, Gudrun, et al. "Dye flocculation using polyampholytes and polyelectrolyte-surfactant nanoparticles." *Journal of applied polymer science* 104.2 (2007): 1342-1349.) The effectiveness of this technique is believed to arise from the fact that charged surfactants can form micelles, which are very effective at partitioning organic molecules from a water medium. The addition of an oppositely charged polymer can aggregate the micelles into macroscopic flocs, which can then be filtered from solution. (Melo, R. P. F., et al. "Removal of Reactive Blue 14 dye using micellar solubilization followed by ionic flocculation of surfactants." *Separation and Purification Technology* 191 (2018): 161-166.) This is a promising solution to removing small organic molecules dissolved in water, which can otherwise be a difficult and costly process. However, there are drawbacks associated with this technique, such as residual surfactant remaining after filtration due to the critical micelle concentration and the low resistance of the flocs to shear, making its removal a delicate operation.

SUMMARY

Methods for removing contaminants from an aqueous medium are provided. One embodiment of a method includes the steps of: adding an amphiphilic anionic random copolymer comprising hydrophilic side chains, hydrophobic side chains, and negatively charged side chains to the aqueous medium, wherein the amphiphilic anionic random copolymer assemble into structures with hydrophobic cores and hydrophilic negatively charged shells; adding a cationic random copolymer comprising hydrophilic side chains and positively charged side chains to the aqueous medium, wherein the amphiphilic anionic random copolymer and the cationic random copolymer form polyelectrolyte complexes that trap the contaminants; and separating the precipitated polyelectrolyte complexes from the aqueous medium.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 3B shows visible absorbance spectra of a 2 μg/mL solution of crystal violet in water as a function added amphiphilic anionic copolymer solution (66 mg/ml). A significant solvatochromic shift was observed upon addition of trace levels copolymer solution.

FIG. 5C shows the electrostatic driving force for dye segregation as the electrostatic energy of different dyes when they were free in solution, segregated in the complexes, and the energy difference between the states.

DETAILED DESCRIPTION

Figure 1:
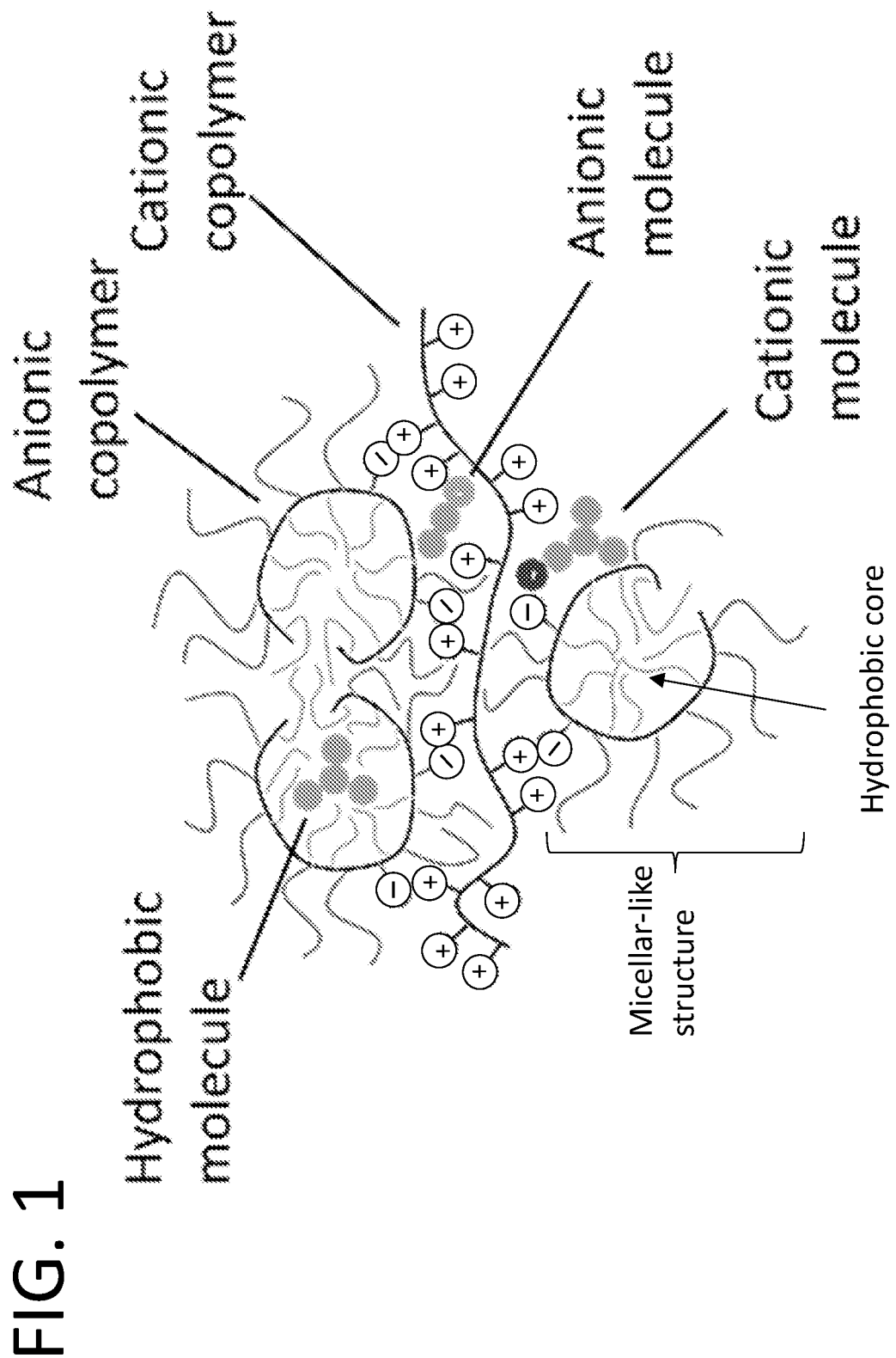
FIG. 1 is a schematic diagram showing anionic, cationic, and hydrophobic contaminant molecules trapped in a polyelectrolyte complex.

Methods for removing contaminants from aqueous media using polyelectrolyte complexes formed from oppositely charged random copolymers are provided. The polyelectrolyte complexes are able to absorb cationic, anionic, and/or hydrophobic contaminants, including organic molecules, and can be easily removed from water. As such, the polyelectrolyte complexes provide a straightforward method for organic contaminant removal from aqueous media.

The polyelectrolyte complexes are formed from a mixture of amphiphilic anionic random copolymers and cationic random copolymers. The random copolymers are polymerized from a statistical distribution of two or more types of monomers, leading to spatial heterogeneity in local composition as the result of different regions of the copolymer chains having different average compositions. The amphiphilic anionic copolymers are anionic polyelectrolytes containing both hydrophilic and hydrophobic side chains that form self-assembled micellar-like structures having hydrophobic domains in aqueous solutions. The cationic polymers are high molecular weight polyelectrolytes containing side chains that act as a flocculant to form stable precipitates, or flocs, through the process of polyelectrolyte complexation when the oppositely charged polymers ionically interact.

Ionic interactions also give the polyelectrolyte complexes the ability to bind and remove charged contaminants from aqueous media. Moreover, the introduction of hydrophobic domains in the polyelectrolyte complexes enables the complexes to interact with and remove hydrophobic contaminants, including uncharged hydrophobic contaminants. This allows small molecule contaminants, which are difficult to filter out using conventional techniques, to be trapped in the complexes and then removed from the aqueous media.

As used herein, the term contaminant refers to a cationic, anionic, or uncharged organic or inorganic chemical species that is dissolved, suspended, or dispersed in water. Although these species are referred to as "contaminants", they need not be inherently harmful to the water. In some cases, the "contaminants" may be substances that have inherent value, such that their recovery from aqueous solution is desirable. Examples of contaminants include organic molecules, such as pesticides and surfactants, metal ions, including heavy metal ions, such as lead, and hydrophobic particles and molecules, such as microplastics or enzymes. For the purposes of this disclosure, microplastics are plastic particles having a largest dimension of 5 mm or less. Some microplastics have a largest dimension in the range from 1 μm to 5 mm. For example, if the microplastics are plastic fibers, they will have a length of 5 mm or less.

The polyelectrolyte complexes provide a cost-effective solution that can be implemented on a large scale to remove a wide variety of contaminants that conventional flocculation techniques do not address (e.g., chemicals, microplastics, hydrophobic contaminants), with a very quick removal rate (e.g., less than ten minutes). The methods for removing contaminants can be used to treat waste water by removing industrial chemicals from waste streams, such as organic dyes from textile processing, or by removing chemicals from municipal or residential wastewater. For example, the methods can be incorporated into existing water remediation processes via addition of the amphiphilic anionic and cationic random copolymers during a flocculation step.

The use of the polyelectrolyte complexes to remove contaminants from an aqueous medium is illustrated schematically in FIG. 1. When the amphiphilic anionic random copolymer is added to the aqueous medium, it assembles into a micellar structure with a hydrophobic core and a hydrophilic, negatively charged shell. When the cationic random copolymer is added to the aqueous medium, the two random copolymers undergo ionic interactions to form stable precipitates via polyelectrolyte complexation.

In the embodiment of FIG. 1, the polyelectrolyte complex has a net positive charge and a heterogeneous charge distribution that facilitates the adsorption of both negatively charged and positively charged contaminants (represented here as anionic and cationic molecules) via ionic interactions. Despite the net positive charge on the complex, positive contaminants are able to absorb due to the heterogeneity of the charge distribution that provides local areas of net negative charge. In addition, the hydrophobic cores formed by the amphiphilic anionic random copolymers facilitate the adsorption of hydrophobic contaminants, including uncharged hydrophobic contaminants.

Once the contaminants are trapped in the precipitated polyelectrolyte complexes, the complexes and the contaminants trapped therein can be removed from the aqueous solution. Because the polyelectrolyte complexes can precipitate out of solution as large flocs (e.g., having sizes of a millimeter or greater), superb mechanical stability, and the ability to withstand high shear, they can be readily separated from an aqueous liquid medium using a variety of methods, such as filtration or centrifugation. Optionally, a salt may be added to the aqueous solution in order to enhance precipitation. As illustrated in the Example, high levels of contaminant removal can be achieved in a single step or using multiple cycles. For example, contaminant removal with an efficiency of at least 70%, at least 80%, at least 90%, and at least 95%, by mass, can be achieved.

The amphiphilic anionic random copolymer is polymerized from monomers having hydrophilic groups, monomers having hydrophobic groups, and monomers having negatively charged groups. In some embodiments, the amphiphilic anionic random copolymer is polymerized from only three monomers: a monomer bearing a hydrophilic group; a monomer bearing a hydrophobic group; and a monomer bearing a negative charge. However, additional monomers can be polymerized into the amphiphilic anionic random copolymer, provided that they do not interfere with the self-assembly of the anionic random copolymer, the formation of the polyelectrolyte complexes, or the adsorption of the contaminants.

The cationic random copolymer is a polymerized from monomers having hydrophilic groups and monomers having positively charged groups. In some embodiments, the cationic random copolymer is polymerized from only two monomers: a monomer bearing a hydrophilic group and a monomer bearing a positive charge. However, additional monomers can be polymerized into the cationic random copolymer, provided that they do not interfere with the formation of the polyelectrolyte complexes or the adsorption of the contaminants. Optionally, monomers that form cross-links between the cationic random copolymer chains can be used.

The cationic random copolymer desirably has a higher molecular weight than the amphiphilic anionic random copolymer and acts as a flocculant, which neutralizes the charge on the anionic copolymer. Cationic random copolymers having molecular weights ($M_w$) of about $1 \times 10^6$ g/mol or greater generally have good flocculating properties; for example, cationic random copolymer with molecular weights in the range from about $1 \times 10^6$ g/mol to about $25 \times 10^6$ g/mol. However, these are not strict limits and, depending upon the particular cationic random copolymer selected, molecular weights outside of this range may have suitable flocculating properties.

The complexes typically include a greater number amphiphilic anionic random copolymer chains than cationic random copolymer chains. In order to promote the formation of polyelectrolyte complexes over smaller polymer clusters and free micelles in solution, it is desirable for the polyelectrolyte complexes to have a charge ratio greater than one and may be more desirable to have a charge ratio of at least 2, where the charge ratio is defined as the ratio of total positive charges on the random copolymers in a polyelectrolyte complex to the total negative charges on the random copolymers in the polyelectrolyte complex. In various embodiments, the polyelectrolyte complexes have a charge ratio of at least 2.5, including embodiments in which the polyelectrolyte complexes have a charge ratio of at least 3. By way of illustration, various embodiments of the polyelectrolyte complexes have charge ratios in the range from 2 to 6, including in the range from 3 to 6.

Because the hydrophilic, hydrophobic, and charge interactions underlying the complexation mechanism are not monomer specific, a wide variety of monomers can be used to form the random copolymers, depending on the particular context or application. The micellar-like structures and polyelectrolyte complexes, are similar in some respects to polyelectrolyte complexes formed from natural biopolymers, such as proteins, but may be formed from synthetic, rather than naturally occurring, polyelectrolytes. Acrylate and methacrylate monomers are suitable candidates due to their ease of polymerization.

Polyether groups are examples of hydrophilic side chains that can be present on the amphiphilic anionic random copolymers. The polyether groups include those having the structure —$(CH_2CH_2O)_n$—, where n represents the number of repeat units in the chain. In various illustrative embodiments, n is in the range from 8 to 24. Typically, the polyether will the terminated by a methyl group. Polyalkylene glycol group-containing monomers, such as polyethylene glycol methyl ether methacrylate monomers, can be used to incorporate polyether side chains into a copolymer. Alkyl chains, including branched and unbranched alkyl chains, are examples of hydrophobic side chains that can be present on the amphiphilic anionic random copolymers. Alkyl group-containing monomers, including $C_3$-$C_{10}$ alkyl group-containing monomers, can be used to incorporate alkyl side chains into a copolymer. Specific examples of such monomers include, but are not limited to ethyl hexyl methacrylate monomers. Sulfonate groups ($SO_3^-$) on the side chains can be used to provide negatively charged side chains. Sulfoalkyl group-containing monomers, such as sulfopropyl methacrylate monomers, can be used to incorporate sulfate groups in a copolymer.

The mole ratio of hydrophobic to hydrophilic side chains in the amphiphilic anionic random copolymer should be sufficient to drive the self-assembly of the copolymer into micelle-like structures having a hydrophobic core and a hydrophilic shell via intermolecular hydrophobic interactions, and the content of negative charge-bearing side chains should be sufficient to promote polyelectrolyte complexation with the cationic random copolymers via ionic interactions and to provide a charge ratio in the polyelectrolyte complexes that favors large complex formation. By way of illustration only, various embodiments of the amphiphilic anionic random copolymers have a hydrophilic monomer content in the range from 40 mol. % to 55 mol. %, a hydrophobic monomer content in the range from 40 mol. % to 55 mol. %, and a negatively charged monomer content in the range from about 5 mol. % to about 10 mol. %. The hydrophobicity or hydrophilicity of a polymer side chain may be determined based on a static water drop contact angle measurement for a homopolymer comprising the side chain, where a contact angle of greater than 90 degrees indicates a hydrophobic side chain and a contact angle of less than 90 degrees indicates a hydrophilic side chain.

Hydroxyalkyl groups are examples of hydrophilic side chains that can be present on the cationic random copolymers. Hydroxyalkyl group-containing monomers, such as hydroxyethyl methacrylate, can be used to incorporate hydroxyalkyl side chains into a copolymer. Ammonium groups, including quaternary ammonium groups, are examples of positively charged groups that can be present in the side chains of the cationic random copolymers. Alkyl ammonium group-containing monomers, such as 2-trimethylammonioethyl methacrylate, can be used to incorporate alkyl ammonium side chains into a copolymer.

The cationic random copolymers should have a hydrophilic side chain content sufficient to render the cationic random copolymers soluble in aqueous solution and a positive charge-bearing side chain content sufficient to promote polyelectrolyte complexation with the amphiphilic anionic random copolymers via ionic interactions and to provide a charge ratio in the polyelectrolyte complexes that favors large complex formation. By way of illustration only, various embodiments of the cationic random copolymer have a hydrophilic monomer content in the range from 35 mol. % to 65 mol. % and a positively charged monomer content in the range from 35 mol. % to 65 mol. %.

Other hydrophobic monomers that may be used include: methyl methacrylate, ethyl methacrylate, propyl methacrylate, butyl methacrylate, isobutyl methacrylate, tert-butyl methacrylate, hexyl methacrylate, lauryl methacrylate, isodecyl methacrylate, stearyl methacrylate, benzyl methacrylate, cyclohexyl methacrylate, isobornyl methacrylate, ethylene glycol phenyl ether methacrylate, 3-(trimethoxysilyl) propyl methacrylate, and the acrylate counterparts thereof.

Other hydrophilic monomers that may be used include: polyethylene glycol methacrylate (Mn=360, Mn=500), polyethylene glycol methyl ether methacrylate (Mn=300, Mn=500, Mn=950, Mn=1500, Mn=4000), 2-hydroxyethyl methacrylate, hydroxypropyl methacrylate, 2-hydroxypropyl methacrylamide, glycidyl methacrylate, 2-(methacryloyloxy)ethyl acetoacetate, vinyl acetate, 1-vinyl-2-pyrrolidinone, 1-vinyl imidazole, and the acrylate counterparts thereof.

Other suitable anionic monomers include: sodium 4-vinylbenznesulfonate, methacrylic acid, acrylic acid, vinyl sulfonic acid, 2-methyl-2-propene-1-sulfonic acid sodium salt, sodium 2-acrylamido-2-methy-1-propanesulfonate, 2-carboxyethyl acrylate, 3-sulfopropyl acrylate potassium salt, itaconic acid, and crotonic acid.

Other suitable cationic monomers include: dimethyl aminoethyl methacrylate, dimethyl aminoethyl acrylate, acrylamide, (3-acrylamidopropyl)trimethylammonium chloride solution, [3-(methacryloylamino)propyl]trimethylammonium chloride, [2-(acryloyloxy)ethyl]trimethylammonium chloride, and N-[3-(dimethylamino)propyl]methacrylamide.

It should be understood that the specific monomers and monomer ratios disclosed herein are for illustrative purposes and that other monomers and monomer ratios can be used. For example, polyelectrolyte complexes can be tailored to have an affinity to specific contaminants, such as organic dye molecules, by changing the monomer composition and/or ratios in order to alter the local charge heterogeneity of the complexes. Biodegradable monomers could also be used to reduce the environmental impact of discharging residual polymer after treating contaminated waste streams. Particular monomer choices could also facilitate the recovery and reuse of the random copolymers to improve the sustainability and cost-efficiency of the polyelectrolyte complex-based remediation system. For example, strongly charged monomers could be replaced with more weakly charged monomers, with charge states that are susceptible to pH changes. Changing the pH and salinity of the solution, would then enable the dissolution of the complexes and separation of the random copolymers via an ion-exchange process.

EXAMPLE

Figure 2A:
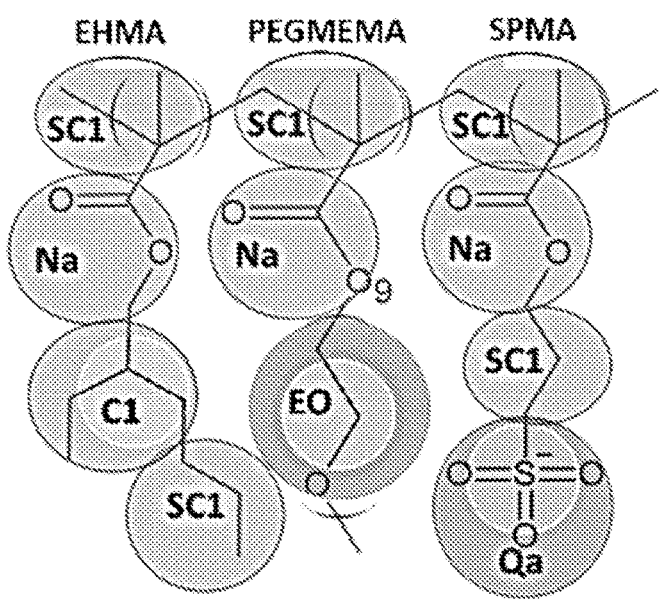
FIG. 2A shows the chemical structure (upper left), MARTINI parameterization (upper right), coarse grain model illustration (lower left), and simulation snapshot (lower right) of an anionic random copolymer.
Figure 2A:
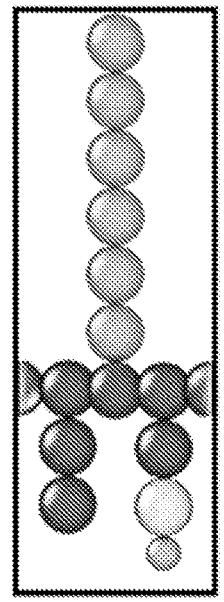
Figure 2A:
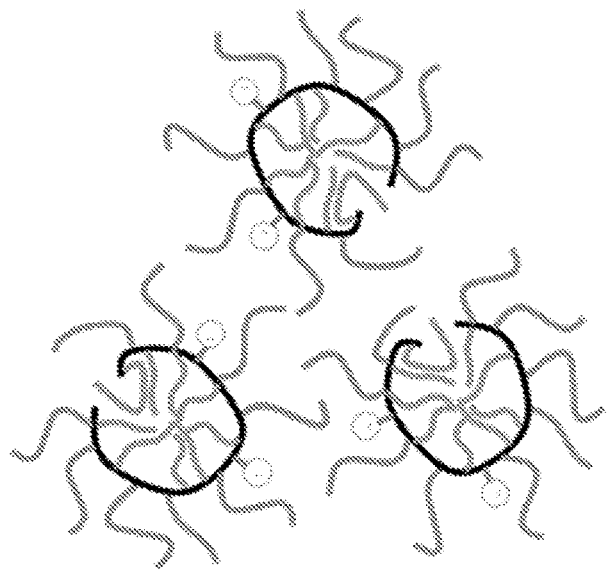
Figure 2A:
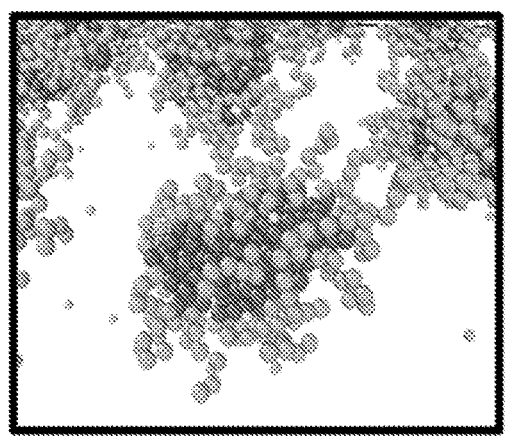
Figure 2B:
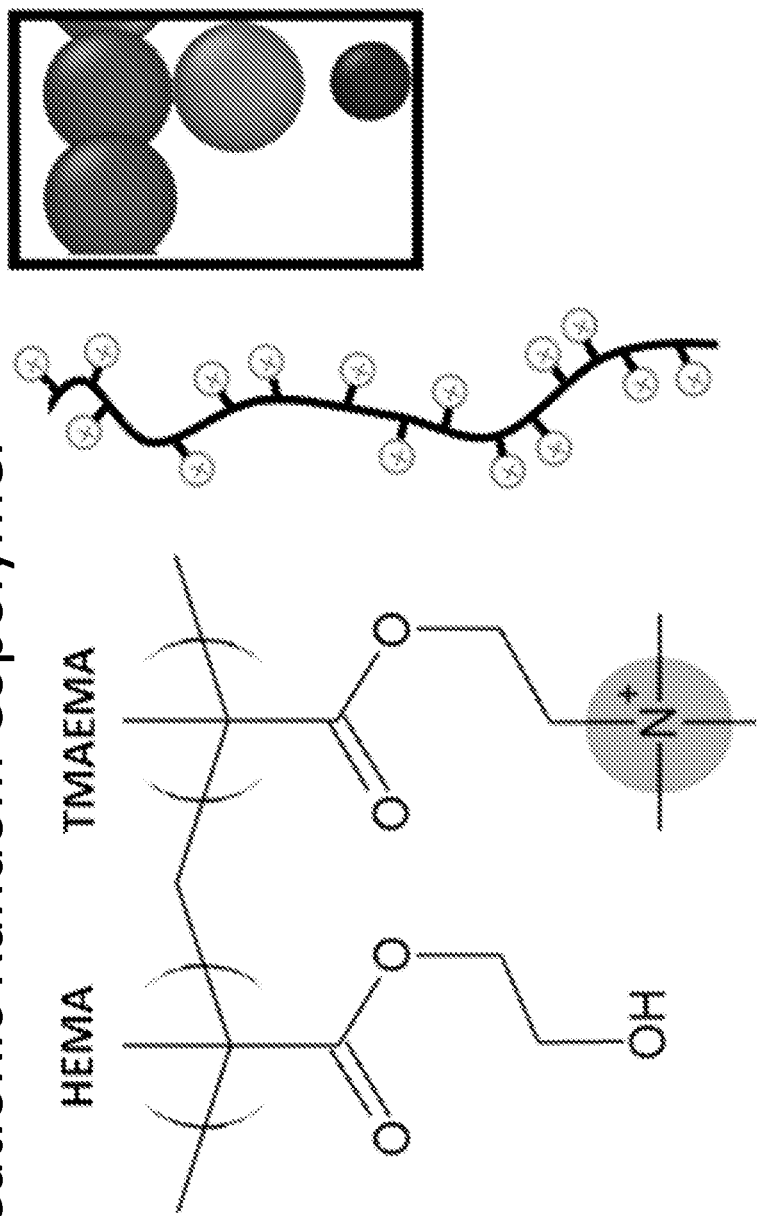
FIG. 2B shows the chemical structure (left), illustration (center), and coarse grain model (right) of a cationic random copolymer.
Figure 2C:
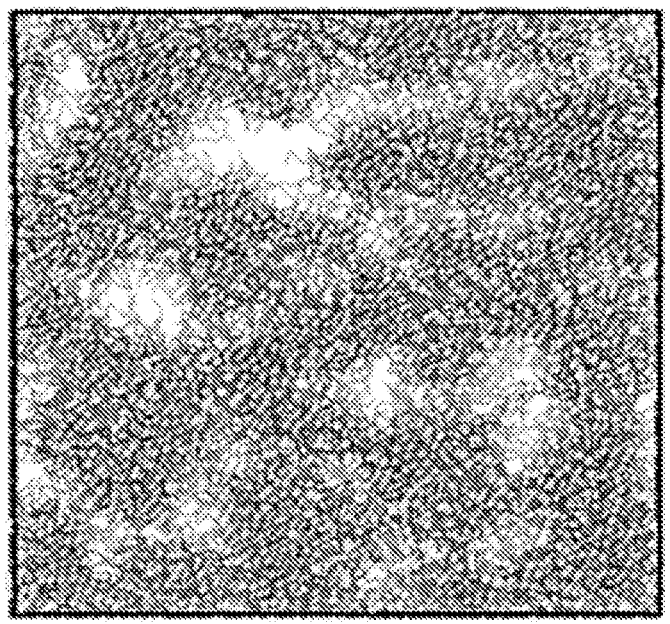
FIG. 2C shows an illustration (left) and simulation snapshot (right) of complexation between the anionic random copolymer and the cationic random copolymer.
Figure 2C:
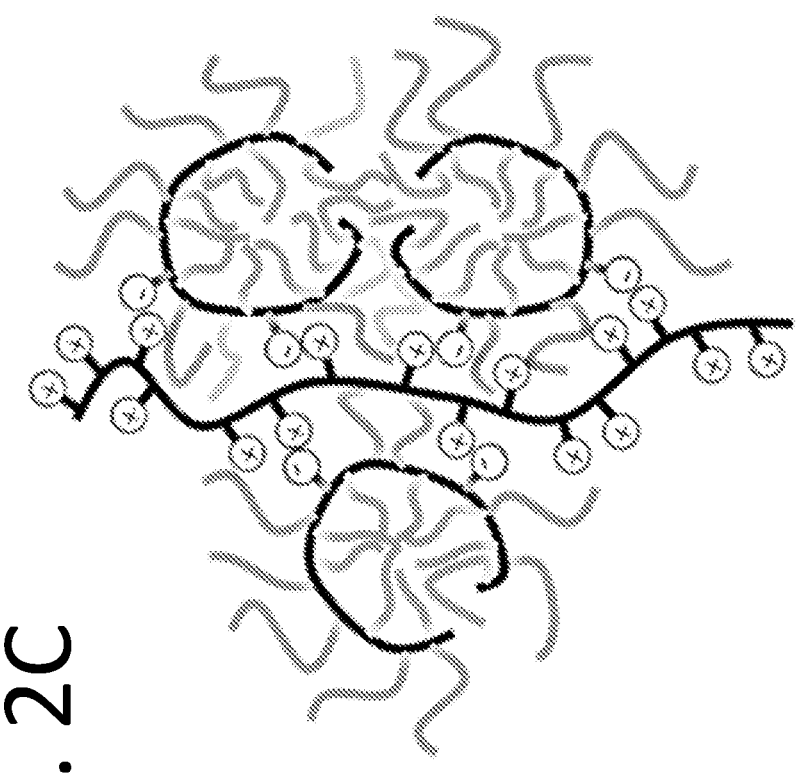
Figure 2D:
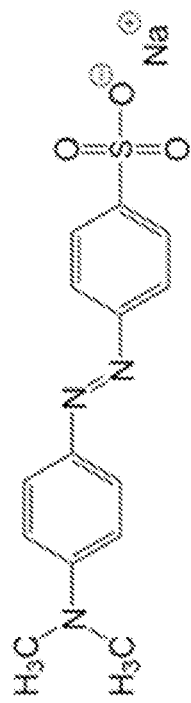
FIG. 2D shows the chemical structure of organic molecules used in the Example.
Figure 2D:
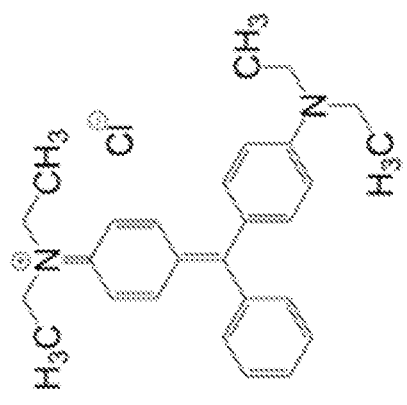
Figure 2D:
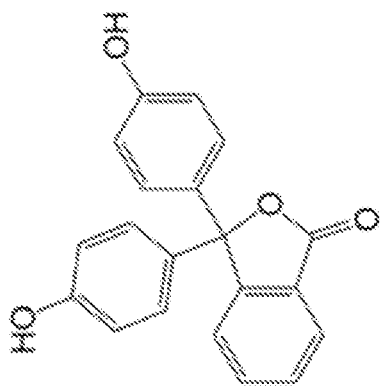

Here, a method was developed to segregate and remove organic molecules from water using two oppositely charged random copolymers through experiments, simulations, and analysis. The anionic copolymer was comprised of hydrophilic, hydrophobic, and anionic methacrylate groups (FIG. 2A). The cationic copolymer was composed of hydrophilic and cationic methacrylate groups (FIG. 2B). These random copolymer polyelectrolytes were synthesized using free radical polymerization and formed macroscopic complexes when mixed (FIG. 2C), successfully encapsulating several organic dyes with varying degrees of effectiveness. Three dyes, crystal violet, methyl orange, and phenolphthalein, were chosen as model molecules for their respective cationic, anionic, and hydrophobic natures as well as ease of quantification via UV-Vis spectroscopy. Perfluorooctanoic acid was also chosen to demonstrate the relevance of this system in filtering difficult-to-remove chemicals from aqueous systems (FIG. 2D).

Figure 2E:
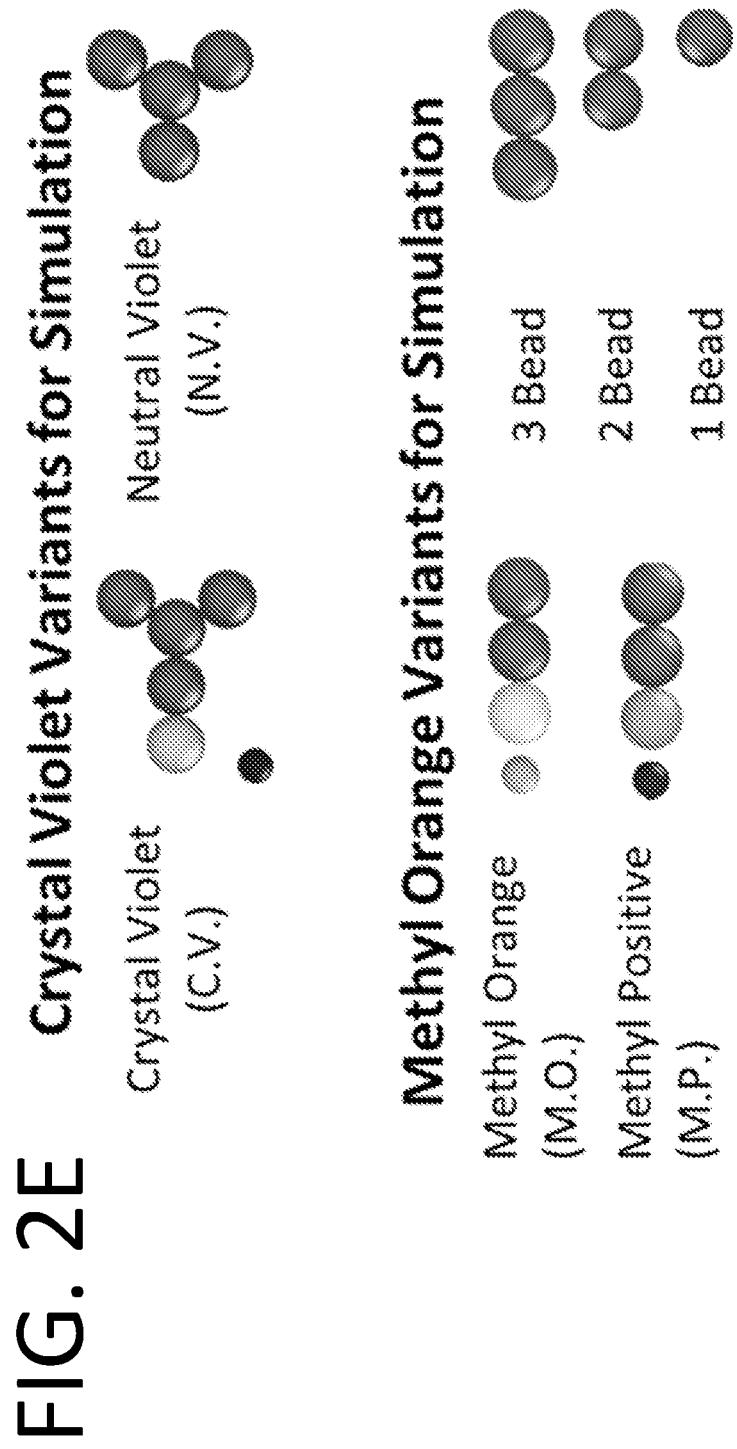
FIG. 2E shows a coarse grain model of organic molecules used in simulations.

Coarse grain molecular dynamics at two different length scales were used to study how the heterogeneous nature of these random polyelectrolyte complexes affects their ability to flocculate dyes. The simulations showed complexes that were highly heterogeneous in composition with hydrophobic domains as well as heterogeneities in the charge distribution throughout the complexes. The origin of these heterogeneities were explained using statistical analysis. Models of the dyes were also included in the simulations (FIG. 2E), and the roles that hydrophobicity and charge played in the removal of the dyes were analyzed.

Results and Discussion

Polymerization and Characterization of Random Copolymers. Free radical polymerization was used to synthesize the anionic and cationic copolymers, and aqueous size exclusion chromatography was used to determine apparent weight-average molecular weight ($M_w$) values (Table 1). The values are apparent as polymers which form hydrophobic domains can exhibit intermolecular aggregation in aqueous media via hydrophobic interactions. This aggregation behavior can be confirmed for the anionic copolymer, as higher apparent $M_w$ values were obtained with higher concentrations of polymer solution. The cationic polymer also showed an anomalously high $M_w$ value for a polymer synthesized by free radical polymerization, which is likely due to the fact that the hydroxyethyl methacrylate (HEMA) monomer used in the cationic polymer is susceptible to chain transfer effects and may act as a branching unit and weak crosslinker. Thus, it is likely that the cationic polymer is highly branched in structure.

The copolymer compositions were analyzed via $^1$H NMR spectroscopy. The anionic polymer has a molar composition of 51% polyethylene glycol methyl ether methacrylate (PEGMEMA), 44% (ethylhexyl methacrylate) (EHMA), and 5% sulfopropyl methacrylate (SPMA). From this information and the apparent $M_w$, an apparent weight-average degree of polymerization ($DP_w$) of 760 was calculated. The peak assignments for the cationic copolymer could not be exactly determined without knowing the branching ratio of the polymer, but upper and lower bounds could be determined for the strictly linear case and strictly branched case (one branch per HEMA monomer). Thus, a reasonable estimate for the molar composition of the cationic polymer is 54-60% HEMA and 40-46% TMAEMA, with an apparent $DP_w$ between 97000 and 100000. From this analysis, it could be concluded that the cationic copolymer had a substantial charge fraction and was much longer than the anionic copolymer, potentially making it an effective flocculant. The anionic copolymer had a significant hydrophobic composition while being slightly charged. See Table 1 for a summary of copolymer characterization.

TABLE 1

Copolymer Characterization.

| Sample | Component 1 mole fraction | Component 2 mole fraction | Component 3 mole fraction | Apparent $M_w$ (g/mol) | Apparent $DP_w$ |
|---|---|---|---|---|---|
| Anionic Random Copolymer | PEGMEMA: 0.51 | EHMA: 0.44 | SPMA: 0.05 | 270 000 | ~760 |
| Cationic Random Copolymer | HEMA: 0.54-0.60 | TMAEMA: 0.40-0.46 | N/A | 16 000 000 | ~97 000-100 000 |

Polyelectrolyte complex formation and dye filtration. Solid polyelectrolyte complexes were formed by mixing 300 μL of 66+/−2 mg/mL aqueous anionic copolymer solutions and 220 μL of 15.0+/−1.5 mg/mL aqueous cationic copolymer solution in 10 mL water, and then adding 20 μL of a 50 mg/mL magnesium sulfate solution. Initially, the mixture turned turbid and cloudy, indicating that polyelectrolyte complexes had grown to a size comparable to the wavelength of visible light. In less than a minute, macroscopic flocs could be observed, indicating the complexes had favorable interactions and a strong tendency to aggregate and coalesce into larger and larger structures. However, it was also observed that the solution tended to be slightly turbid after macroscopic flocculation, indicating that there were colloidal polyelectrolyte complexes remaining in solution. These were likely charge-stabilized colloids as there was an excess of positive charge in the complexes. The addition of divalent salt in the form of magnesium sulfate appeared to precipitate the remaining polyelectrolyte complexes and left the solution clear. The final aggregate sizes were usually on the order of millimeters and were robust to mechanical perturbation. When the mixture was stirred with a magnetic stir bar, the aggregates did not break apart even at stirring speeds exceeding 1000 rpm. After filtration through a 0.22 μm membrane filter, the measured solid concentration in the filtered solution was 0.17+/−0.02 mg/mL. This concentration corresponds to a polyelectrolyte complexation efficiency of 99.2%.

The amounts of added copolymer solution were determined using a titration procedure by adding a 15.0+/−1.5 mg/mL cationic polymer solution in 20 μL increments to a 10.3 mL solution containing 1.90+/−0.05 mg/mL anionic copolymer. It was consistently found that macroscopic flocculation occurred at 220 mL cationic solution added., which may correspond to a sort of equivalence point. However, this is not a traditional equivalence point for polyelectrolyte complexes, as the molar ratio of positive charges to negative charges of the complexes are not 1:1 but has a significant excess of positive charge with a ratio of 3.3-3.6:1. This amount of copolymer solution added to form macroscopic complexes does not change when adding dyes or contaminants at a concentration of 2 μg/mL, except for the case of phenolphthalein, where 240 μL of cationic solution was needed for flocculation. This difference is likely due to a slight salt concentration of about 1 mM NaCl from the preparation procedure.

Figure 3A:
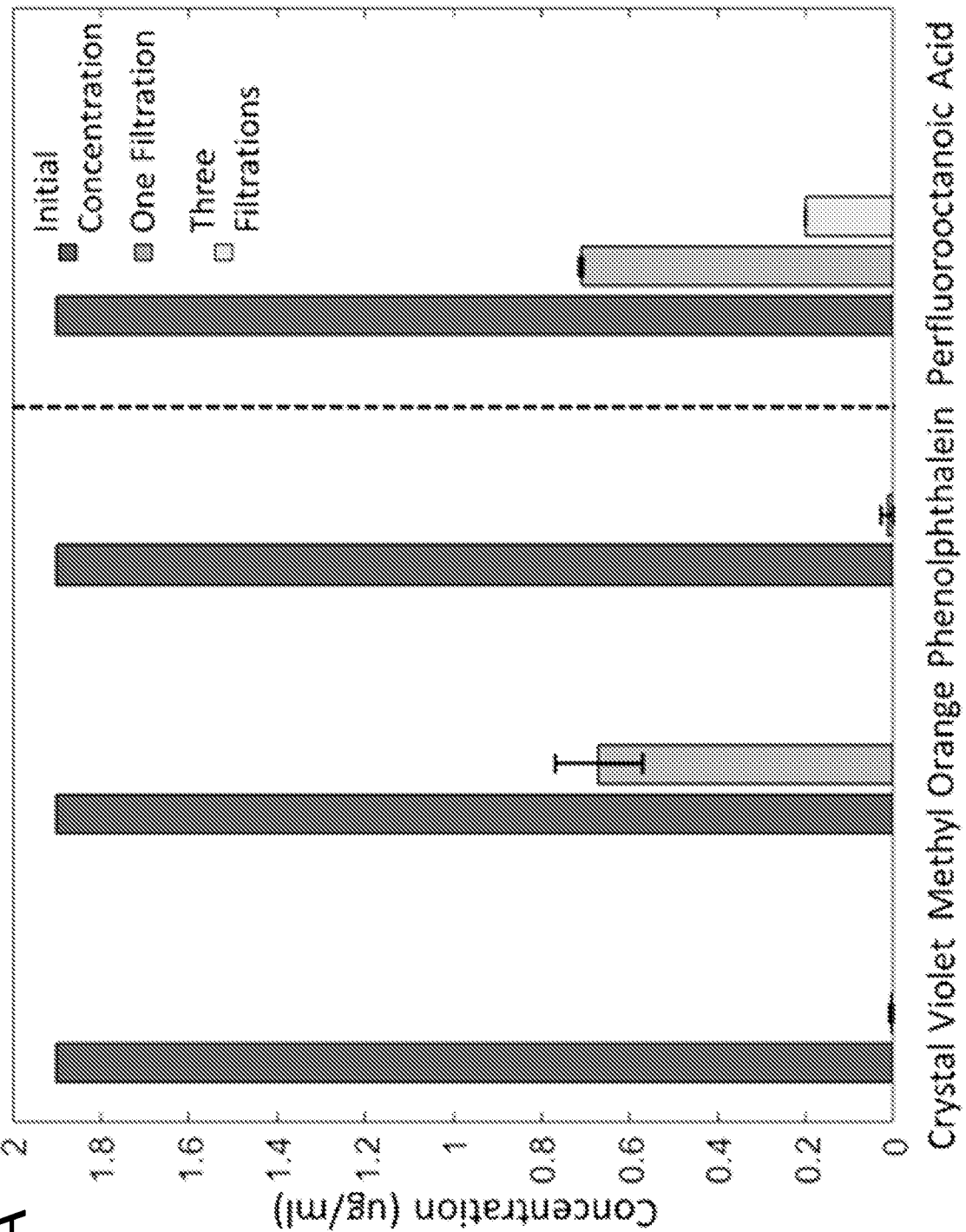
FIG. 3A shows the contamination removal results from the Example. For each of the three dyes studied, the results are averages from three separate filtration samples. Crystal violet and phenolphthalein were quantitatively removed. For perfluorooctanoic acid, results for one and three filtrations on a sample of perfluorooctanoic acid are shown. Error bars are standard deviations from three runs of a single sample.

The removal efficiency for the dyes was determined by comparing the peak visible light absorption of the filtered samples with complexes removed to a calibration curve from stock solutions of the dye. It was found that the removal of crystal violet, the cationic dye, was quantitative with a single filtration removing over 99.5% of the dye, reaching the detection limit of the instrument used. Similar results were obtained for phenolphthalein, a hydrophobic dye, with a removal efficiency of >98%. It should be noted that filtration experiments for phenolphthalein were performed in its colorless, neutral form, whereas quantification experiments were performed in its colored, charged form. The removal efficiency with a single filtration of methyl orange, the anionic dye, was 65+/−5%. The removal efficiency of PFOA was determined in a manner similar to the dyes, except liquid chromatography with mass spectrometry using electrospray ionization was used. A value of 63.0+/−0.5% was obtained for a single filtration. Repeated filtrations were also performed for a sample of perfluorooctanoic acid, with the process of adding anionic copolymer solution, then cationic copolymer solution and magnesium sulfate being repeated twice for a total of three filtrations. 89.0+/−0.5% of the perfluorooctanoic acid was removed in this experiment, demonstrating that this system can significantly reduce the concentration of environmentally relevant contaminants from aqueous systems. These results are shown in FIG. 3A.

Confirmation of dye encapsulation and micelle formation in anionic copolymer. Crystal violet and methyl orange are solvatochromic dyes, exhibiting visible absorbance spectral shifts with changes in the hydrophobicity of the local environment. (Petcu, A. R. et al., Arab. J. Chem. 2016, 9 (1), 9-17.) This behavior was leveraged to obtain information on the interactions of the dyes with the copolymer and resulting complex. FIG. 3B shows that solutions of crystal violet exhibited a solvatochromic red shift when mixed with small amounts of anionic copolymer solution, with a peak absorbance shift from 593 nm to 598 nm. As the small amount of copolymer added did not change the overall polarity of the solvent, the crystal violet must have interacted strongly with the local hydrophobic domains of the anionic copolymer. This shift was retained when complexes of the anionic and cationic copolymers were formed, indicating that crystal violet was located near the hydrophobic pockets that existed within the polyelectrolyte complex. No solvatochromic shift was observed in the absorbance spectrum when anionic copolymer was added to a solution of methyl orange nor did the resulting complex exhibit a visual color shift. These results indicate that methyl orange did not interact strongly with the hydrophobic domains of the polyelectrolyte complex, possibly due to a weaker hydrophobic character and/or the same charge repulsion from the anionic copolymer. This may explain the lower removal efficiency of methyl orange compared to crystal violet. Molecular dynamics simulations were turned to in order to differentiate more clearly the effects that charge or hydrophobicity have in the segregation and removal of these organic molecules and their molecular scale interactions with the polyelectrolyte complexes.

Simulations of Polymers and Dyes. Coarse-grained molecular dynamics at two different length scales were used to study the interactions of crystal violet, methyl orange, and variations of these molecules with the polymer complexes. The MARTINI model provides information on the conformation of the anionic random copolymer while a more coarse, implicit solvent model was developed to study the formation of complexes and interactions with the dyes. Using the MARTINI model, simulations of only the anionic copolymers and their counterions without cationic copolymers or dyes were first performed. The monomer fractions for the anionic copolymers matched the fractions used in experiments (EHMA: 0.44, PEGMA: 0.51, SPMA: 0.05), and each copolymer had a degree of polymerization (DP) of 100. It was observed that the anionic copolymers formed micelles with both models. Monomer fractions were used that correspond to experiments (0.54 HEMA, 0.46 TMAEMA). In this case, DP=200 was chosen in order to represent the larger molecular weight of the cationic polymer used in the experiment. In both models, the anionic copolymers that were not interacting with the cationic copolymers took on micellar configurations due to the hydrophobic side chains and backbone. When interacting with the cationic polymers, the anionic copolymers took on much more stretched conformations that still featured hydrophobic domains.

The two models confirm that the anionic copolymer forms a hydrophobic core with a hydrophilic corona and charges sitting at the edge of the hydrophobic core.

As noted above, the experimental polymer charge ratio, i.e., the total ratio of positive charges on all of the copolymers to the total number of negative charges on all of the copolymers, was 2.9-3.3. (As in the simulations, counterions make the system charge neutral overall).

Figure 4:
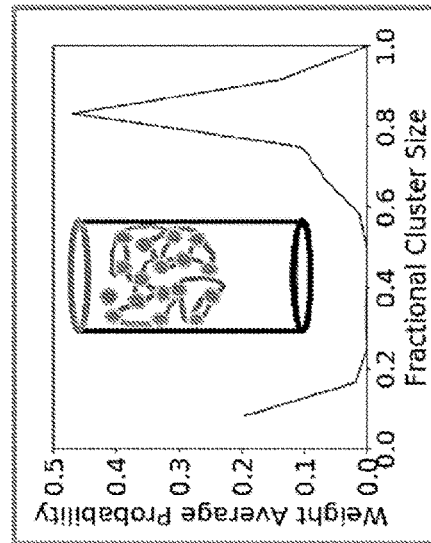
FIG. 4 shows the probability of a polymer chain being in a certain sized cluster, where the cluster size is measured as a fraction of the finite sized simulation, as a function of polymer charge ratio, which is defined as the ratio of the number of positive charges to the number of negative charges in polymer clusters (the system is electrically neutral due to counterions). At a low charge ratio, free micelles, small clusters, medium sized clusters, and large clusters comprised of nearly every chain were observed (left). As the polymer charge ratio was increased above 1, there was an electrostatic driving force for the free micelles to enter the dense phase. The free micelles should be incorporated in the dense phase even if it is not connected through hydrophobic interactions (center). As the charge ratio was further increased to 2 and above, the medium sized clusters effectively disappeared, leaving the polymers in one dense phase (far right test tube). This agrees well with the experiments where a polymer charge ratio above 3 was sufficient to drive all the polymers into a macroscopic phase.
Figure 4:
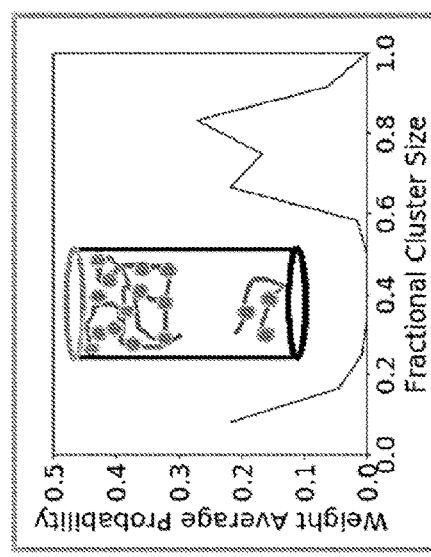
Figure 4:
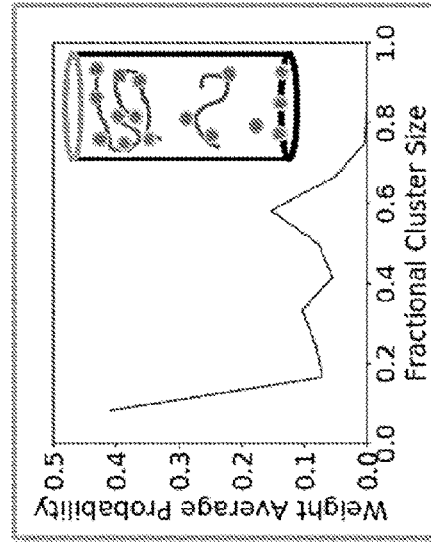

In FIG. 4, the percolation (counting only the hydrophobic beads) of the system as more cationic polymer is added was explored by examining the probability of finding a polymer in a cluster of a certain size as a function of polymer charge ratio. This probability is a weight average probability, as opposed to a number average probability, meaning that the probabilities are normalized by the total number of polymers in a cluster of a certain size as opposed to the total number of clusters of a certain size. Thus, a delta function for a cluster size of 1 signifies a single cluster of all the components. At polymer charge ratios below 1, large clusters constituting up to 60% of all polymers were observed. In these clusters, cationic copolymers served as high valency cross-linkers, forming hydrophobic connections with on average 8 anionic copolymers in a "pearl necklace"-like structure. The ratio of charges on the average cationic polymer to the average anionic polymer was 9.2, meaning that the charge on the average cationic polymer was incompletely compensated by the 8 anionic copolymers on average to which it was connected. Consequently, free micelles and smaller clusters containing both cationic and anionic polymers were also observed. For the same reason, these smaller clusters always had a net positive charge even though the system was net negatively charged. As the charge ratio was increased above 1, more cationic polymer was added and there was an electrostatic driving force for the free micelles to enter the densely connected phase. However, many cationic polymer chains still did not form hydrophobic connections and become part of the clusters. The smaller dispersions were still observed, but as the charge ratio continued to increase and more cationic polymers were added, individual cationic polymers were observed with much lower probability and nearly disappeared.

Figure 5A:
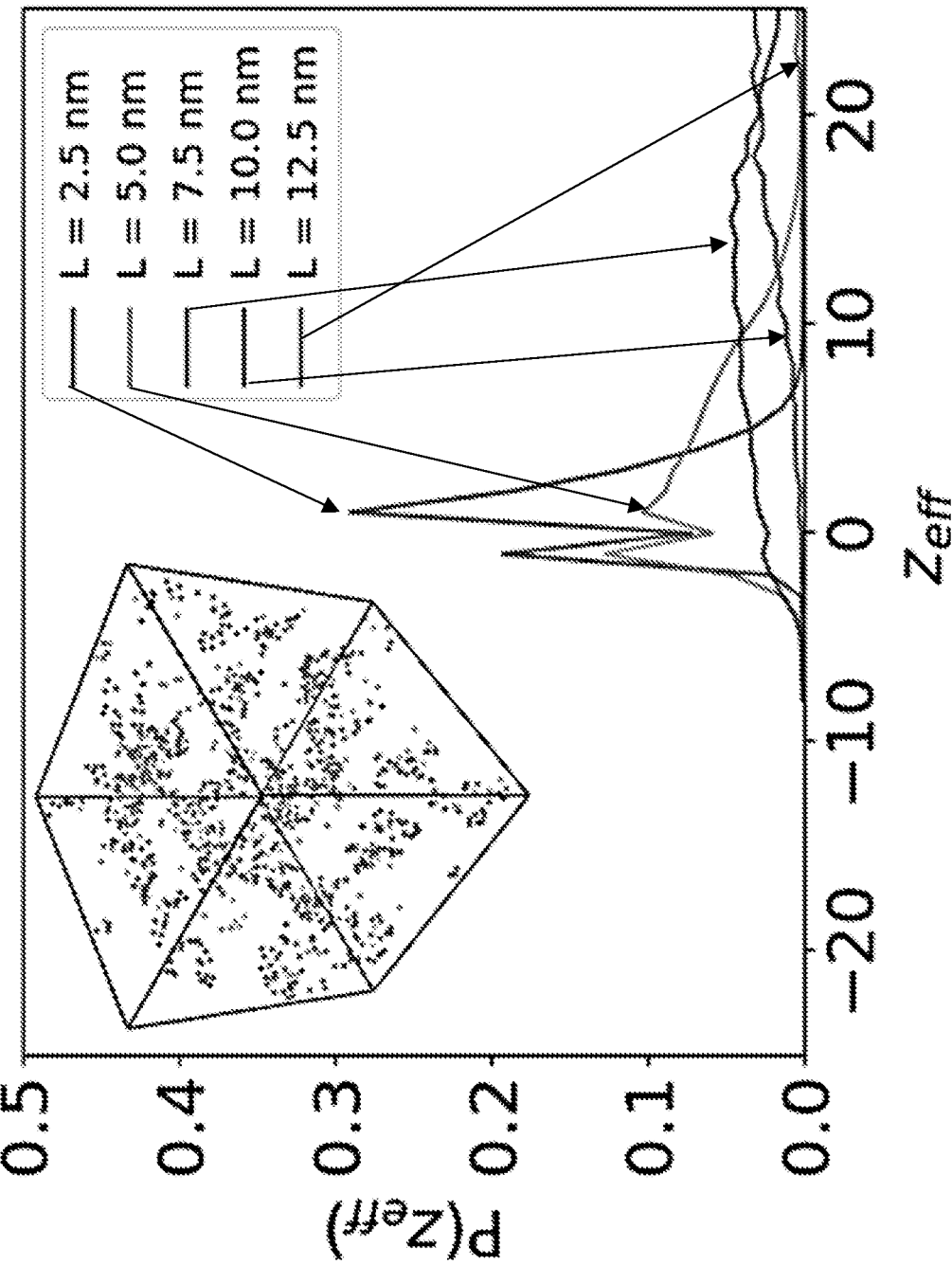
FIG. 5A shows calculations of charge heterogeneity for charges on polymers. The simulation box was split into smaller cells of different lengths, L, and then the effective charge from the polymers in these boxes was calculated according to Eq. 1. Box sizes of 2.5 nm and 5 nm show two peaks where the effective charge was ±1. This shows how the hydrophobic energy of the polymers led to local charge segregation in these polyelectrolyte complexes.
Figure 5B:
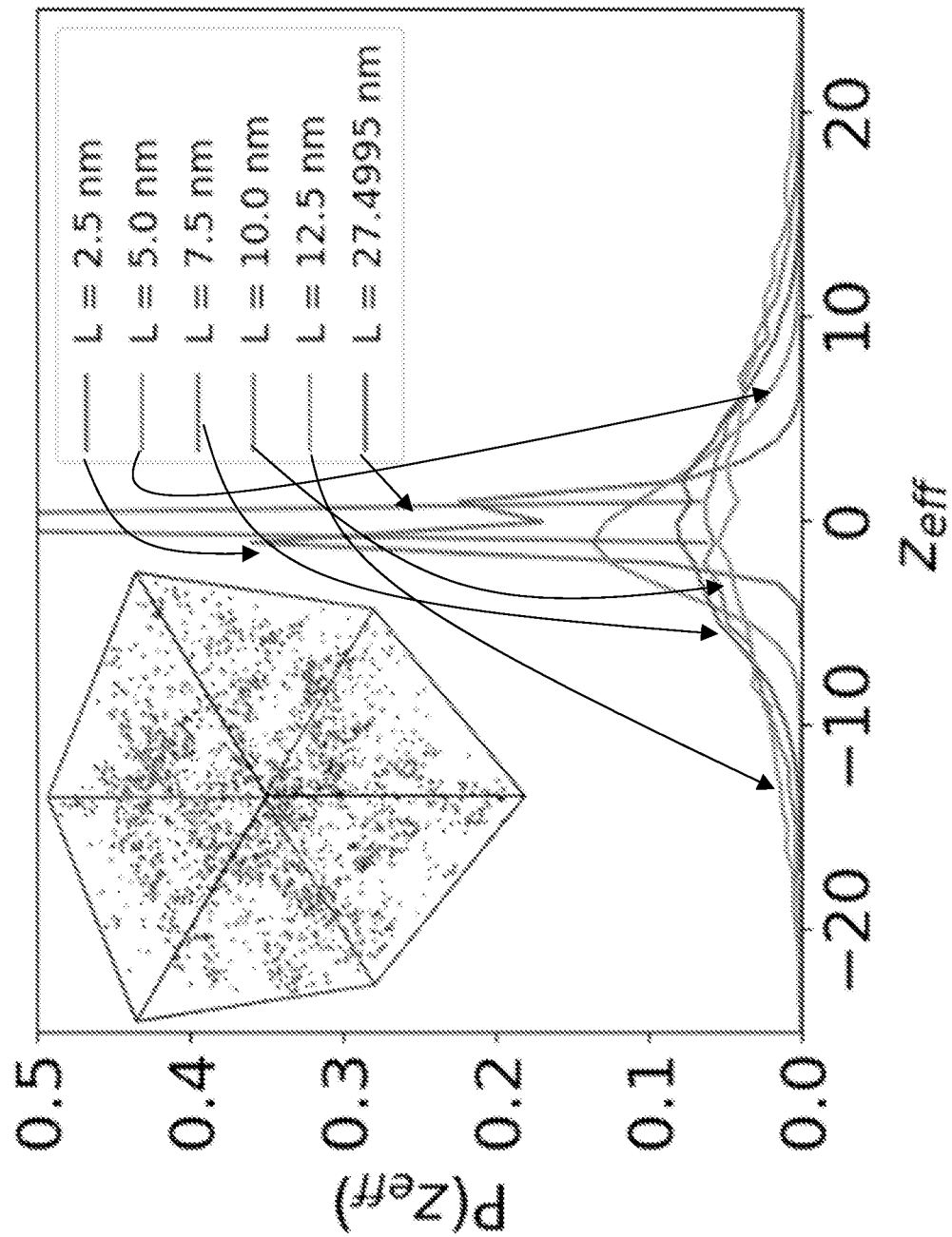
FIG. 5B shows calculations of charge heterogeneity for charges on polymers and counterions. The same calculation was performed as described above. Free counterions helped to negate some of this charge segregation, but at small length scales the two peaks were still observed. At larger length scales, a Gaussian distribution centered at 0 effective charge was observed.

The use of positively and negatively charged polymers combined with the statistical nature of copolymerization creates a system where individual polymers have a range of compositions in terms of charge sign, fraction, and hydrophobicity. It has been shown that amphiphilic copolymers with a distribution of compositions should phase separately into many phases with different compositions. However, this was not observed in the simulation or the experiment due to the addition of the charged monomers and the energetic cost of creating many interfaces. Instead, local charge heterogeneity was observed as shown in FIGS. 5A-5C. This is shown by splitting the simulation box into many smaller cells of a certain size, L, and calculating the effective charge in those cells, $Z_{eff}$, $$Z_{eff} = N^+ - N^- \quad \text{eq. 1}$$

where $N^+$ is the number of positive charges in the cell, and $N^-$ is the number of negative charges in the box. In FIG. 5A, $N^+$ and $N^-$ were restricted to be charges on the polymers; in FIG. 5B, they could be any charge, including those from the counterions. At small cell sizes, two peaks were observed at ±1 with and without the inclusion of counterions in the effective charge of the box. That is, the system developed domains with different fractions of charge. The energy penalty, $F_c$, associated with this charge heterogeneity is proportional to the square of the effective charge, divided by the cell size, L, in terms of the Bjerrum length, $l_B = e^2/(4\pi\varepsilon_0 \varepsilon K_B T)$, with $\varepsilon_0$ being the permittivity of vacuum, $\varepsilon$ the relative permittivity of the media, e the elementary charge, $K_B$ is Boltzmann's constant, and T is absolute temperature. Here, the Bjerrum length in water was used, 0.7 nm, which comes from its bulk dielectric constant, $\varepsilon=80$.

As the cell size increased, the effective charge scaled with the number of charges, which scaled with the volume of the cell or the cell size cubed. Thus, the overall charge energy scaled with the cell size to the fifth power.

$$F_c/K_B T \propto \frac{Z_{eff}^2 l_B}{L} \propto l_B L^5 \quad \text{eq. 2}$$

The compensation for this charge heterogeneity must come from the hydrophobic interactions of the anionic and cationic copolymers. The energy of these hydrophobic interactions, $F_H$, came from the interface between the solvent and hydrophobic domains. They scaled with the surface tension, $\gamma$, and, by dimensional analysis, the cell size squared.

$$F_H/K_B T \propto \gamma L^2 \quad \text{eq. 3}$$

Thus, the charged term had a much stronger scaling with the cell size, and as a result, the two peaks at ±1 were observed only at small length scales, obtained by minimizing the sum of eqs. 2 and 3 giving $L_{hetero} \sim (\gamma/l_B)^{1/3}$. Free counterions helped to compensate the charge on the polymers, decreasing this length scale in FIG. 5B. Above this length scale, the population of cells with different numbers of charges tended towards a Gaussian distribution with zero average net charge, while the distribution width became broader as L increased. This is due to the stretched conformations of the copolymers in complexes. It was noted that when L increased beyond a critical value, the width of the charge distribution should have shrunk again because there was no system with macroscopic excess charge. Finally, when L approached the system box size, a delta function was observed at zero given the electroneutrality condition imposed in the simulations.

Figure 6A:
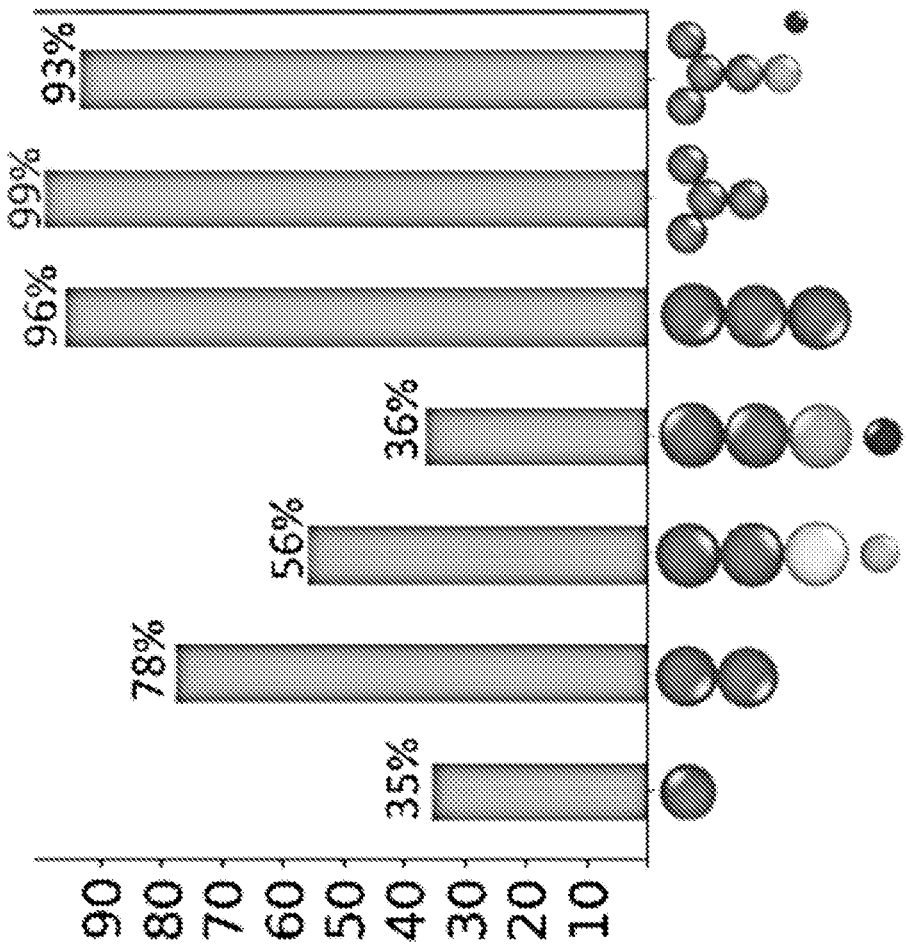
FIG. 6A shows percentage segregation for the seven simulated dyes. The ratio of dyes to polymer monomers was 1:130 and the volume fraction of polymers was ~10%. Segregation is defined as any hydrophobic dye bead being within a cutoff distance from a hydrophobic polymer bead. Almost all condensation occurred on the anionic polymers which formed stretched micelle-like structures with hydrophobic cores. The more hydrophobic a dye was, as measured by number of hydrophobic beads, the higher the percentage segregated. Adding a charged bead to a hydrophobic dye always decreased the percentage segregated.

The charge heterogeneity also impacts the absorption of the dyes. In order to explore the generality of the method to segregate different molecules, seven variations of crystal violet and methyl orange coarse grain dyes were used, shown in FIGS. 3A-3B. These molecules were added into the simulations with a polymer charge ratio of 3.25 at a ratio of 1 dye molecule: 130 polymer monomers. A dye is considered segregated if any of its hydrophobic beads is within a certain distance of a hydrophobic bead belonging to a polymer. Following experimental trends in removal rate, the crystal violet had a higher condensation rate than methyl orange. This makes sense given the additional hydrophobic benzene ring in the crystal violet that effectively increases its hydrophobic interaction with the complex. Overall, for purely hydrophobic dyes, the more hydrophobic beads it contains, the higher the percentage of segregated contaminants in the sample. It was also seen that adding a charged bead to a given hydrophobic structure decreased the percentage of molecules segregated. These segregation results are shown in FIG. 6A.

As expected for the net positively charged polymer complex, the negative methyl orange dye was more readily segregated than its positive counterpart. This is supported by FIG. 5C, which shows that the electrostatic driving force was stronger for methyl orange than its positive counterpart. That is, for the negative dye, the electrostatic energy decreased upon condensation into the polymer complex, whereas for the positive dyes, there was almost no difference in electrostatic energy despite the polymer charge ratio of 3.25. FIG. 5C also shows that, due to the charge heterogeneity demonstrated in FIG. 5A, the absorption of the positive dyes was not adversely impacted by the net positive charge on the complexes. The heterogeneity of the charges in the complex made it possible for both negative dyes to reduce their energy upon condensation. In contrast, the positive dyes were relatively unaffected because there were areas of net positive and net negative charge in the polymer complex, which was net positive. This encouraging generality of the method is not anticipated by simple intuition, which shows the importance of the heterogeneities in charge and composition caused by the random copolymers (some domains have positive charge and some negative) as shown in FIGS. 5A and 5B.

Figure 6B:
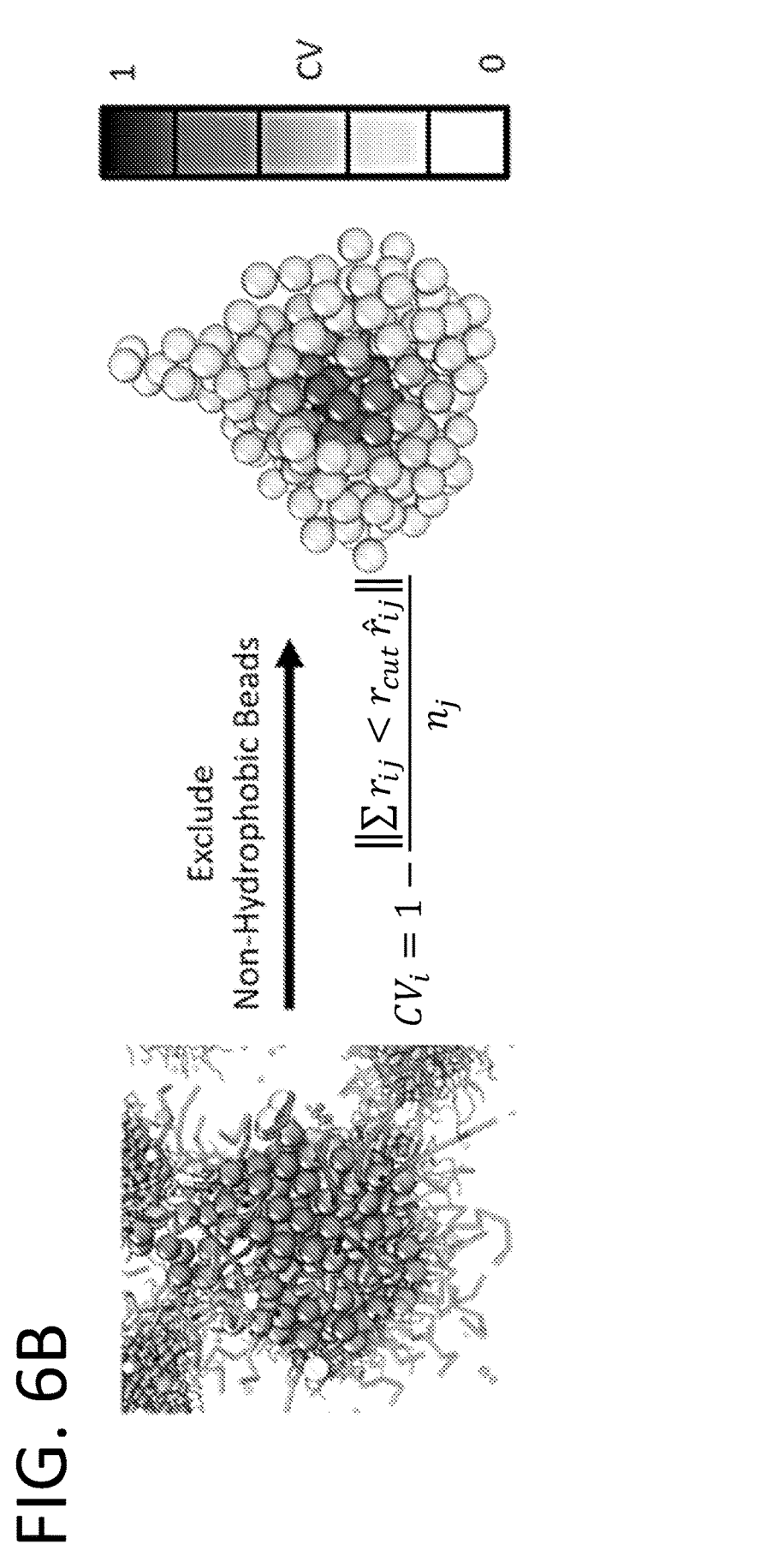
FIG. 6B shows circular variance as a measurement of dye location within hydrophobic domains. The circular variance was used to measure the degree of hydrophobic burial of a dye. It was calculated by taking the length of the vector sum all the unit vectors from the dye to hydrophobic beads which were within the cutoff distance. This was then divided by the number of vectors and subtracted from 1. Thus, 1 was the maximum burial and 0 is the minimum.
Figure 6C:
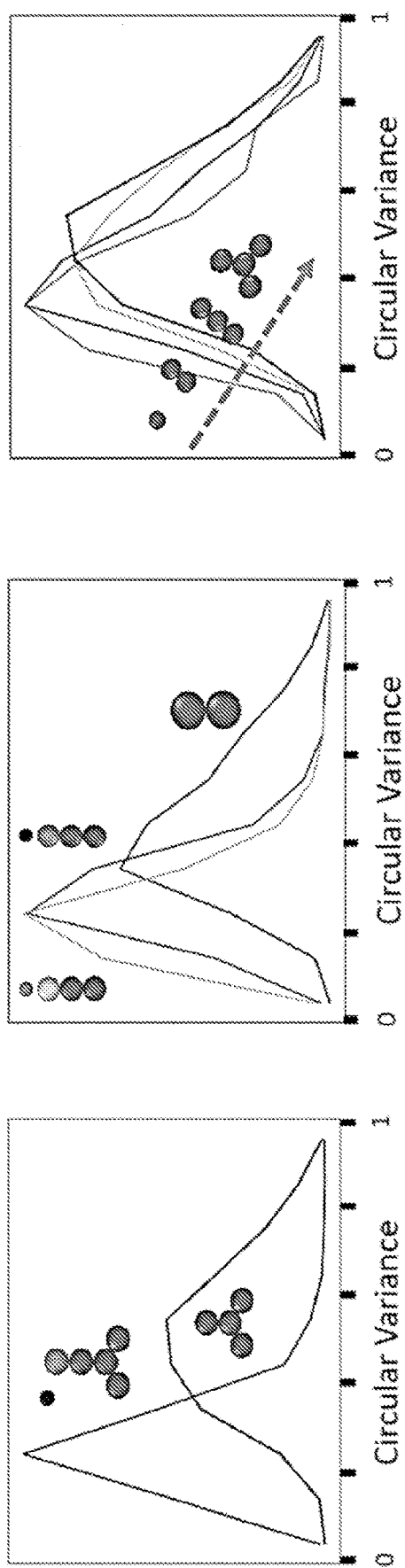
FIG. 6C shows the position of dyes within hydrophobic domains as measured by circular variance. Left and center show specific comparisons for dyes with and without charges. The uncharged dyes were always much more buried. The right shows how the degree of burial continued to increase as the number of hydrophobic beads in the dye was increased.

This generality is explained by examining the location of condensed dyes within the hydrophobic cores present in the polymer complexes. To this end, the hydrophobic circular variance was measured. A full explanation of the circular variance is given in FIG. 6B, but it was used as a measure of the degree of burial of the dyes. Maximum burial by hydrophobic beads corresponds to a circular variance of 1 and minimum burial to a circular variance of 0. The distribution of circular variances for the different dyes is shown in FIG. 6C. There were two basic distribution shapes, one for charged and one for uncharged dyes. The distribution for charged dyes skewed to lower values, meaning that these dyes were restricted to be closer to the surface of the hydrophobic region due the charges preferring the ionic solvent environment. However, a difference was noticed in the segregation behavior of oppositely charged dyes, with 10% of the segregated anionic methyl orange condensed to a hydrophobic bead on the cationic copolymer, compared to 1% for the segregated crystal violet. Despite the fact that both dyes reside at the interface of hydrophobic and hydrophilic regions of the polyelectrolyte complex, their hydrophobic interactions can be significantly different given that the methyl orange is more likely to interact with the cationic copolymer than the crystal violet. This discrepancy may help explain why a solvatochromic shift was not observed in experiments where methyl orange was segregated into complexes.

The distribution for the uncharged dyes tended toward higher values of burial, and the distributions indicate more burial as more hydrophobic beads were added. This burial means a stronger overall interaction between the hydrophobic portion of the dye and the hydrophobic domain of the complex, explaining the trend of lower percent segregated for charged dyes despite no adverse effects observed in the electrostatic potential (FIG. 5C). The stretched conformations of the anionic copolymers could have contributed to the removal of the charged dyes because they have a higher surface area to volume ratio than spherical micelles and thus allow more low circular variance sites for the charged dyes to condense.

Materials and Methods

Materials. The monomers used for polymerization, polyethylene glycol methyl ether methacrylate ($M_n$=500 g/mol, PEGMEMA), ethyl hexyl methacrylate (EHMA), 3-sulfopropyl methacrylate salt (SPMA), 2-hydroxyethyl methacrylate (HEMA), and 2-trimethylammonioethyl methacrylate (TMAEMA), were purchased from Sigma, and inhibitors were removed under inhibitor removers from Sigma. The chain transfer agent dodecanethiol, NMR solvent deuterium oxide, thermal initiator benzoyl peroxide, antioxidant hydroquinone, and dyes crystal violet, methyl orange, phenolphthalein, and contaminant perfluorooctanoic acid were also purchased from Sigma. Ethanol, hexane, HPLC-grade water, distilled water, hydrochloric acid, sodium hydroxide, and sodium chloride were purchased from ThermoFisher.

The anionic random copolymer was synthesized as follows. Benzoyl peroxide (0.40 mmol, 96 mg) was added to a 50 mL test tube and was dissolved in 25 mL of ethanol. PEGMEMA (34 mmol, 16 mL) and EHMA (43 mmol, 9.6 mL) were added to the solution, along with SPMA (8.5 mmol, 2.1 g) dissolved in 1.6 mL of water. Dodecanethiol (0.30 mmol, 72 µL) was added to inhibit side reactions involving crosslinking of polyethylene glycol side chains. The solution was then heated to 65° C. for 150 min. The polymer was precipitated and washed several times in hexane, followed by drying under vacuum at 40° C. for 30 min. The polymer was then dissolved in a 70-30 vol % deionized water-ethanol mix and dialyzed against 2 L of a 70-30 vol % deionized water-ethanol mix for 1 day, and then dialyzed against 2 L of deionized water for 2 days, changing the dialysis solution each day. The aqueous polymer solution retrieved from dialysis was directly used in experiments.

The cationic random copolymer was synthesized as follows. Benzoyl peroxide (0.21 mmol, 50 mg) was added to a 20 mL test tube and dissolved in 4 mL of methanol and 2 mL of water. HEMA (41 mmol, 5 mL) and TMAEMA (20 mmol, 5 mL of 75 w/w % solution) were added and the solution was heated to 65° C. for 165 min. The polymer was precipitated in ethanol. Excess solvent was removed with flowing air, and the polymer was dissolved in deionized water and dialyzed in 2 L of deionized water for 2 days, changing the dialysis solution after 1 day. The aqueous polymer solution retrieved from dialysis was directly used in experiments.

The mass concentration of polymer solutions was determined by drying a known volume of solution in an oven and weighing the mass of the remaining polymer. Reported results are an average of three separate measurements.

Previous research has shown that PEGMEMA monomers tend to participate in unwanted radical crosslinking reactions, which causes gelation of the polymer sample at low conversion. (Bo, G. et al., *J. Polym. Sci. Part Polym. Chem.* 1992, 30 (9), 1799-1808.) Additionally, polymers containing PEGMEMA may also gel during handling or storage after precipitation or recovery and are most stable when dissolved in solvent. The addition of chain transfer agent suppresses gelation during polymerization, and the addition of an antioxidant such as hydroquinone can suppress gelation when in dry form. These precautions were taken in this example.

Copolymer characterization. Copolymer composition was characterized using $^1$H NMR spectroscopy (Bruker X500 NMR spectrometer), with deuterium oxide as solvent. To prepare appropriate solutions for NMR analysis, a small amount of hydroquinone was added to the aqueous copolymer solutions before drying in a vacuum oven and redissolving in deuterium oxide. The final polymer concentrations were ~20 mg/mL, and the final concentration of hydroquinone was ~2 mg/mL. The addition of an antioxidant inhibits a known gelation effect noted in previous literature for polymers containing polyethylene glycol sidechains. (Bo, G. et al., 1992) It also inhibits a gelation effect observed in the cationic polymer. Full dissolution of the dried anionic random copolymer can require up to 24 h.

Apparent molecular weight was characterized by aqueous gel permeation chromatography (Agilent 1260 series HPLC, Superdex 200 Increase 10/300 GL column) with a multi-angle static light scattering detector (Wyatt DAWN HELEOS II) in 0.1M NaCl aqueous buffer. An approximate refractive index increment (dn/dc) value was measured for each polymer by using an Atago pocket refractometer on a serial dilution of polymer solution. The dn/dc value of the anionic polymer in 0.1 M NaCl buffer was determined to be 0.155 mL/g, and the dn/dc value of the cationic polymer in 0.1 M NaCl buffer was determined to be 0.143 mL/g.

Quantification of dye and contaminant removal. Crystal violet, methyl orange, and PFOA are water soluble, and a 200 µg/mL stock solution was prepared by mixing the appropriate mass of reagent with distilled water. Phenolphthalein was not easily dissolved in water even at concentrations below its solubility limit, and a stock solution of 50 µg/mL was prepared by dispersing 500 µg of phenolphthalein in 10 mL of water, adding 100 µg of 0.1 M sodium hydroxide solution, and then adding 100 µg of 0.1 M hydrochloric acid. Adding sodium hydroxide to the solution changes phenolphthalein into its charged form, which is readily soluble in water. The hydrochloric acid reverts the solution to its original pH and the phenolphthalein into its neutral form, which is key for the complexation experiments.

Visible absorbance spectra were obtained (Thermo Scientific Evolution 201 Spectrophotometer) for crystal violet, methyl orange, and phenolphthalein solutions at various concentrations, and five-point calibration curves were determined by comparing peak absorbance wavelength of the solution to its concentration. Anionic copolymer was added to crystal violet solutions in order to account for the solvatochromic shift. Visible absorbance spectra for phenolphthalein were obtained under basic conditions, as solutions of phenolphthalein are colorless under neutral or slightly acidic conditions. The concentration of dyes after filtration was determined by comparing the peak absorbance of the absorbance spectrum to the calibration curve. Reported results were obtained by measurements on three separate samples.

For PFOA solutions, concentrations were measured by liquid chromatography-mass spectrometry with electrospray ionization (Bruker Amazon-X) in negative polarity mode using a reverse phase column (Acentis Express C18, 5 cm, 2.1 mm I.D., 5 µm). A flow rate of 0.3 mL/min was used with a 60/40 vol % acetonitrile/water solvent mixture. Chromatogram peaks with m/z of 368.9 g/mol and 412.9 g/mol, corresponding to counts of ionized fragments of PFOA, were integrated with a peak elution time of 160 s. A five-point calibration curve was constructed, and the concentration of PFOA in filtered solution was determined by comparing the integrated peak values to the calibration curve. Reported results were obtained from three measurements on the same sample.

Coarse Grain Simulations. Molecular dynamic simulations were run at two different length scales. The finer simulations used the MARTINI forcefield with polarizable water. (The MARTINI Force Field: Coarse Grained Model for Biomolecular Simulations|The Journal of Physical Chemistry B; and Yesylevskyy, S. O. et al., *PLOS Comput. Biol.* 2010, 6 (6), e1000810.) In these simulations, the distribution of different groups in micelles formed by the anionic copolymers was studied. The model parameters used in these simulations were taken from a combination of sources studying similar polymers. (The MARTINI Force Field: Coarse Grained Model for Biomolecular Simulations|The Journal of Physical Chemistry B; and Campos-Villalobos, G. et al., *Mol. Syst. Des. Eng.* 2019, 4 (1), 186-198.) The coarse grain molecular dynamics simulations were performed using the HOOMD-blue package. (Anderson, J. A. et al., *J. Comput. Phys.* 2008, 227 (10), 5342-5359; and N. LeBard, D. et al., *Soft Matter* 2012, 8 (8), 2385-2397.) An implicit water forcefield comprised of hydrophobic, hydrophilic, and charged beads was used to model both types of polymers and many different dyes. The backbone of all methacrylate polymers is composed of one hydrophobic bead per monomer, which is bonded to the next monomer via a harmonic bond. The side chains are unique to each monomer. The side chain of EHMA is modeled with two more hydrophobic monomers, PEGMEMA is composed of 6 hydrophilic beads, and SPMA is a hydrophobic, followed by a negatively charged bead, which is accompanied by a positive counterion. The cationic polymers are made of TMAEMA, which was modeled using a positive bead and accompanying counterion, and HEMA, which has no side chain. Crystal violet, methyl orange, and variants of these dyes were also modeled using the same hydrophobic and charged beads. By utilizing additional angle potentials, their rigid shapes were conserved. The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for removing contaminants from an aqueous medium comprising the contaminants, the method comprising:

adding an amphiphilic anionic random copolymer comprising hydrophilic side chains, hydrophobic side chains, and negatively charged side chains to the aqueous medium, wherein the amphiphilic anionic random copolymer assembles into structures with hydrophobic cores and hydrophilic negatively charged shells;

adding a cationic random copolymer comprising hydrophilic side chains and positively charged side chains to the aqueous medium, wherein the amphiphilic anionic random copolymer and the cationic random copolymer form polyelectrolyte complexes that trap the contaminants; and separating the polyelectrolyte complexes from the aqueous medium.

2. The method of claim 1, wherein the contaminants comprise organic molecules.

3. The method of claim 1, wherein the contaminants comprise microplastics.

4. The method of claim 1, wherein the hydrophilic side chains of the amphiphilic anionic random copolymer comprise polyether chains.

5. The method of claim 1, wherein the hydrophobic side chains of the amphiphilic anionic random copolymer comprise alkyl chains.

6. The method of claim 1, wherein negatively charged side chains comprise terminal $SO_3^-$ groups.

7. The method of claim 1, wherein the hydrophilic side chains of the amphiphilic anionic random copolymer comprise polyether chains, the hydrophobic side chains of the amphiphilic anionic random copolymer comprise alkyl chains, and the negatively charged side chains comprise terminal —$SO_3^-$ groups.

8. The method of claim 7, wherein the alkyl chains comprise ethylhexyl groups and the negatively charged side chains comprise sulfopropyl groups.

9. The method of claim 1, wherein the hydrophilic side chains of the cationic random copolymer comprise hydroxyalkyl groups.

10. The method of claim 1, wherein the positively charged side chains comprise terminal ammonium groups.

11. The method of claim 1, wherein the hydrophilic side chains of the cationic random copolymer comprise hydroxyalkyl groups and the positively charged side chains comprise terminal quaternary ammonium groups.

12. The method of claim 11, wherein the hydroxyalkyl groups comprise hydroxy ethyl groups and the positively charged side chains comprise trimethylammonioethyl groups.

13. The method of claim 11, wherein the hydrophilic side chains of the amphiphilic anionic random copolymer comprise polyether chains, the hydrophobic side chains of the amphiphilic anionic random copolymer comprise alkyl chains, and the negatively charged side chains comprise terminal —$SO_3^-$ groups.

14. The method of claim 1, wherein the ratio of the positive charges on the cationic random copolymer to negative charges on the amphiphilic anionic random copolymer is at least 2.5.

15. The method of claim 1, further comprising separating the contaminants from the polyelectrolyte complexes.

16. The method of claim 1, wherein the aqueous medium is industrial, municipal, or residential wastewater.

17. The method of claim 1, wherein the cationic random copolymer has a weight average molecular weight of at least $1 \times 10^6$ g/mol.

* * * * *